A. C. BALLOU.
TRANSPLANTING IMPLEMENT.
APPLICATION FILED JULY 10, 1912.
1,058,138.
Patented Apr. 8, 1913.
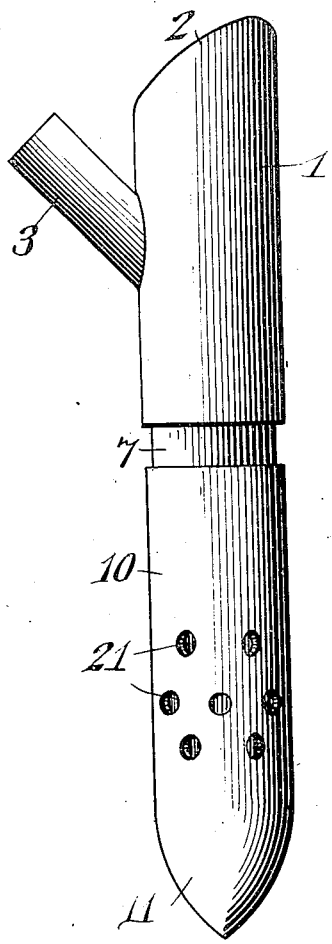
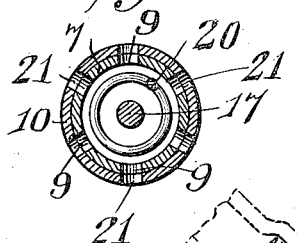
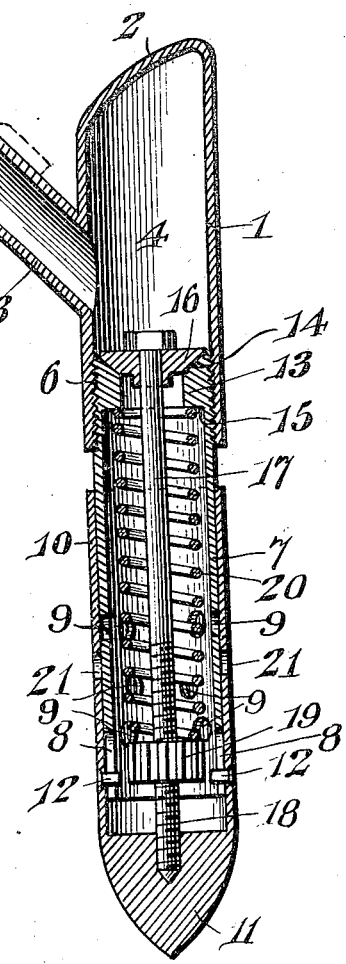
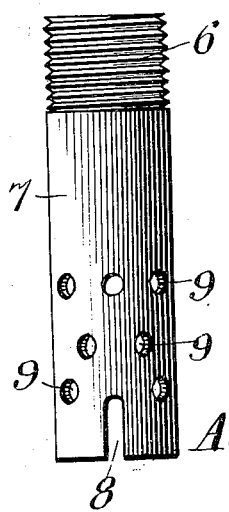
Alonzo C. Ballou,
INVENTOR

UNITED STATES PATENT OFFICE.

ALONZO C. BALLOU, OF SOUTH BOSTON, VIRGINIA.

TRANSPLANTING IMPLEMENT.

1,058,138. Specification of Letters Patent. Patented Apr. 8, 1913.

Application filed July 10, 1912. Serial No. 708,721.

*To all whom it may concern:*

Be it known that I, ALONZO C. BALLOU, a citizen of the United States, residing at South Boston, in the county of Halifax and State of Virginia, have invented certain new and useful Improvements in Transplanting Implements, of which the following is a specification.

This invention has reference to improvements in transplanting implements, and its object is to provide a tool which may be readily manipulated by one hand of the operator in forming a hole in the ground, and at the same time causing an appropriate amount of water to be ejected from the tool into the earthy walls of the hole, so that the earth into which the plant is placed is already watered and the proper conditions are provided for the rooting of the plant.

In accordance with the present invention there is provided a telescoping device of proper diameter and length to form an appropriate hole in the ground with the end designed to enter the ground shaped to force its way easily into the ground, while the other end of the implement is conveniently formed for grasping by the hand of the operator. The manipulating end of the device is provided with a water chamber and water connections, whereby a water reservoir of any suitable type may be connected to the water chamber, while between the earth piercing end of the device and the water chamber there is provided a valve having a normal tendency to close and responsive to the telescoping of the device to move to the open position, while ports in the telescoping members are movable into and out of alinement, so that when the device is forced into the ground and the water controlling valve is open, the ports are brought into alinement, and streams of water will flow from the interior of the device against the earthy walls of the hole to thoroughly wet the same, ready for the reception of the plant. While the device is applicable to the transplanting of various plants, it is designed more particularly for the transplanting of tobacco plants.

The invention will be best understood from a consideration of the following detailed description taken in connection with the accompanying drawings forming a part of this specification, with the further understanding that while the drawings disclose a practical form of the invention, the latter is susceptible of other practical embodiments, wherefore the invention is not confined to any strict conformity with the showing of the drawings, but may be changed and modified so long as such changes and modifications mark no material departure from the salient features of the invention.

In the drawings:—Figure 1 is an elevation of the device ready for use, except connections with the supply of water. Fig. 2 is a longitudinal diametric section of the structure shown in Fig. 1 and also showing a water hose connected to the device. Fig. 3 is an elevation of the inner ported member carried by the manipulating end of the device. Fig. 4 is a cross section of the portion of the device designed to enter the ground, the section being taken across a set of ports when the latter are in alinement.

Referring to the drawings, there is shown a tubular member 1 having one end 2 closed and arranged at an angle to the longitudinal axis of the member 1 and also slightly rounded to conform readily to the palm of the hand of the operator, so that pressure in the direction of the length of the device may be readily applied. At one side of the body member 1 there is formed a neck 3 opening into the interior of the body 1, which interior incloses a chamber 4 to which reference will hereinafter be made. The neck 3 opens into the chamber 4 and at the end remote from the body 1 is designed to receive a hose 5 or other suitable means for conducting water from any suitable source through the neck 3 into the chamber 4. Since it is desirable that the water supplied to the chamber 4 should be under some pressure, the hose 5 may be considered as connected to any suitable supply of water, whereby the desired pressure may be established within the chamber 4. That end of the body member 1 remote from the end 2 is internally threaded to receive the threaded end 6 of a tube 7, the other end of which tube is normally open and provided on diametrically opposite sides with longitudinal entering slots 8, while at appropriate points in the tube 7 near the slots 8 are ports or passages 9 usually arranged in circular series, but not necessarily confined to any particular arrangement. The diameter of the tube 7 is preferably less than the diameter of the body member 1, and applied to this tube 7 is a sleeve 10 so constructed as to fit snugly, yet freely, about the tube 7, so as to slide thereon. The sleeve 10 is of sufficient length to extend beyond the slotted end of the tube 7 and there is formed with a pointed or conical closed end 11 designed as a ground entering point for the device. It is desirable that the sleeve 10 should not turn on the tube 7, so the sleeve is provided at appropriate points with inwardly directed studs 12 so positioned as to enter the slots 8 and move therealong when the sleeve 10 and tube 7 move axially in telescoping relation one to the other.
That end of the tube 7 provided with the screw threads 6 is internally contracted in the form of an annular inwardly directed flange 13, which at the corresponding end of the tube is formed into a valve seat 14, while the other end of the flange forms an annular shoulder 15.

Adapted to the valve seat 14 is a valve 16 carried by a valve stem 17 extending axially through the tube 7, while the end of the valve stem 17 remote from the valve 16 is threaded, as indicated at 18, and enters an axially threaded hole in the earth piercing end 11 of the sleeve 10. Applied to the threaded end 18 of the valve stem 17 is a nut 19, the peripheral portion of which may be corrugated or roughened, so that it may be readily engaged and turned. Surrounding the valve stem 17 is a spring 20, with one end abutting against the shoulder 15 and the other end engaging the corresponding face of the nut 19. The sleeve 10 has a series of ports or passages 21 corresponding to the ports 9 of the tube 7.

The tendency of the spring 20 is to move the sleeve 10 along the tube 7 in a direction away from the body member 1 and the extent of this movement is determined by the length of the valve stem between the earth piercing end 11 of the sleeve 10 and the valve 16, for when the latter engages the valve seat 14 further movement of the sleeve 10 under the action of the spring 20 is arrested.

The parts are so proportioned that when pressure is applied to the end 2 of the body member 1 with the earth piercing end 11 against some resisting body, the spring 20 will be compressed and the sleeve 10 and tube 7 will have a relative telescoping movement one on the other until further movement is stopped by the engagement of the end of the sleeve 10 remote from the end 11 with the adjacent end of the body member 1. In this position of the parts with the spring compressed, the ports 21 and 9 are in matching relation, so that there is a free passage from the interior of the tube 7 to the exterior of the sleeve 10. The amount of resistance which may be offered to the telescoping of the device by the spring 20 is readily regulated by adjustment of the nut 19 forming one abutment of the spring 20, and when the ports are brought into alinement the nut 19 is readily turned by the introduction of a suitable implement through appropriate matching ports 9 and 21.

Let it be assumed that the parts of the device are in the positions shown in Figs. 1 and 2 and that the neck 3 is in communication with a suitable source of water, by means of the tube or hose 5. Water may find its way through the hose 5 and neck 3 into the chamber 4, but cannot pass beyond because one end of the chamber is provided with a closure and the other end is closed by the valve 16, which at this time is held to its seat by the expansion of the spring 20. If, now, the piercing end 11 of the device be placed against the surface of the ground and pressure be applied to the end 2 of the body member 1, the piercing member will enter the ground to the extent desired by the operator and due to the pressure applied. This piercing movement will cause the telescoping of the tube 7 and sleeve 10, which action is resisted by the spring 20 and this telescoping movement as the implement enters the ground will ultimately bring the ports 21 and 9 into alinement at the same time moving the valve 16 from its seat 14, so that water entering the chamber 4 finds its way readily into the interior of the tube 7 and by way of the alined ports to the exterior of the sleeve 10, where it comes into contact with the earthy walls of the hole produced by the entrance of the tool into the ground, and these walls receive and absorb water to a greater or less extent dependent upon the length of time the device or tool is left in the ground. When, however, pressure upon the body member 1 is relieved the spring 20 by its expansion causes movement of the body member 1 lengthwise of the sleeve 10 until such movement is arrested by the closing of the valve 16, at which time the ports 9 and 21 are out of alinement, so that further flow of water from the interior of the device is prevented both from the chamber 4 and from the interior of the tube 7. By this means the flow of water commences at once as soon as the ports 9 and 21 are brought into coincidence and ceases at once as soon as the withdrawing of the tool or device from the ground commences, so that no water is wasted and the device is particularly cleanly.

As soon as the hole is formed in the ground it is at once irrigated automatically, so that the operator has but to force the device into the ground and withdraw it after such a time as his experience shall dictate, when the formed hole is ready for the reception of the plant, and is in the best condition for causing the quick rooting and proper growing of the plant.

What is claimed is:—

1. A transplanting implement provided with means for entering the ground, and means within the ground entering portion responsive to the same force exerted in causing the implement to enter the ground to at the same time cause irrigation of the walls of the hole produced by said implement.

2. A transplanting implement provided with means for entering the ground, and a valve structure within the ground entering portion of the implement responsive to the same force exerted in causing the implement to enter the ground to permit the flow of liquid into a portion of the ground surrounding the implement while the latter is still in the ground.

3. A transplanting implement provided with a ground entering portion, and automatic means for causing a flow of liquid into the ground surrounding the implement when the latter is in the ground, the said ground entering portion having ports through its side walls for such flow of liquid.

4. A transplanting implement having telescoping members, one of which is shaped to enter the ground, said members being provided with coacting controlling means for liquid to cause a flow of liquid when the implement is in the ground and to arrest the flow of liquid when the implement is out of the ground.

5. A transplanting implement comprising telescoping members one provided with a ground entering end and the other with a manipulating end, the ground entering member being also provided with a valve and the manipulating member with a valve seat and both members being provided with ports movable into and out of alinement in accordance with the relative positions of the two members.

6. A transplanting implement comprising a manipulating portion provided with a tubular extension having ports therein and a valve seat and also provided with means for the admission of liquid to said manipulating member, and an earth entering member in telescoping relation to the tubular extension of the manipulating member, said earth entering member being provided with a valve in coactive relation to the valve seat of the other member and with ports movable into and out of alinement with the ports of the tubular extension.

7. A transplanting implement comprising a manipulating portion provided with a tubular extension having ports therein and a valve seat and also provided with means for the admission of liquid to said manipulating member, and an earth entering member in telescoping relation to the tubular extension of the manipulating member, said earth entering member being provided with a valve in coactive relation to the valve seat of the other member and with ports movable into and out of alinement with the ports of the tubular extension, the two members being provided with a spring common to both and tending to hold the ports and valve in closed position, and the spring being provided with adjusting means accessible from the exterior of the device.

8. A transplanting implement comprising a manipulating member in the form of a tube with one end closed and at the other end provided with a tubular extension having a valve seat at the end adjoining the manipulating member and also provided with ports through its walls, said manipulating member inclosing a chamber and having means for the entrance of liquid thereto, and an earth entering member in the form of a sleeve adapted to the exterior of the tubular extension of the first-named member, said sleeve having one end formed into an earth piercing portion and provided with ports through its walls adapted to be moved into matching relation to the ports through the walls of the tubular extension of the other member, a threaded stem carried by the second named member and in turn carrying a valve adapted to the valve seat of the first named member, a spring surrounding the stem and tending to separate the two members in the direction of the longitudinal axis thereof, and a spring adjusting nut carried by the threaded stem and accessible through ports of the two members when in alinement.

In testimony whereof I have affixed my signature in presence of two witnesses.

ALONZO C. BALLOU.

Witnesses:
PERCY H. MOORE,
JOHN H. SIGGERS.